Figures 2, 3, 4:
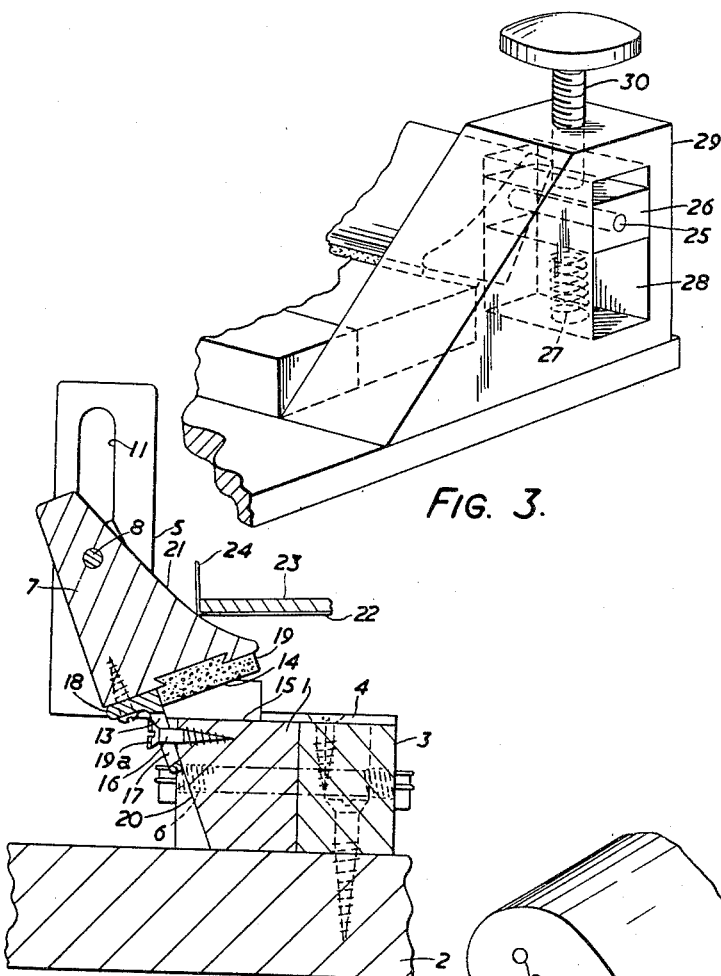

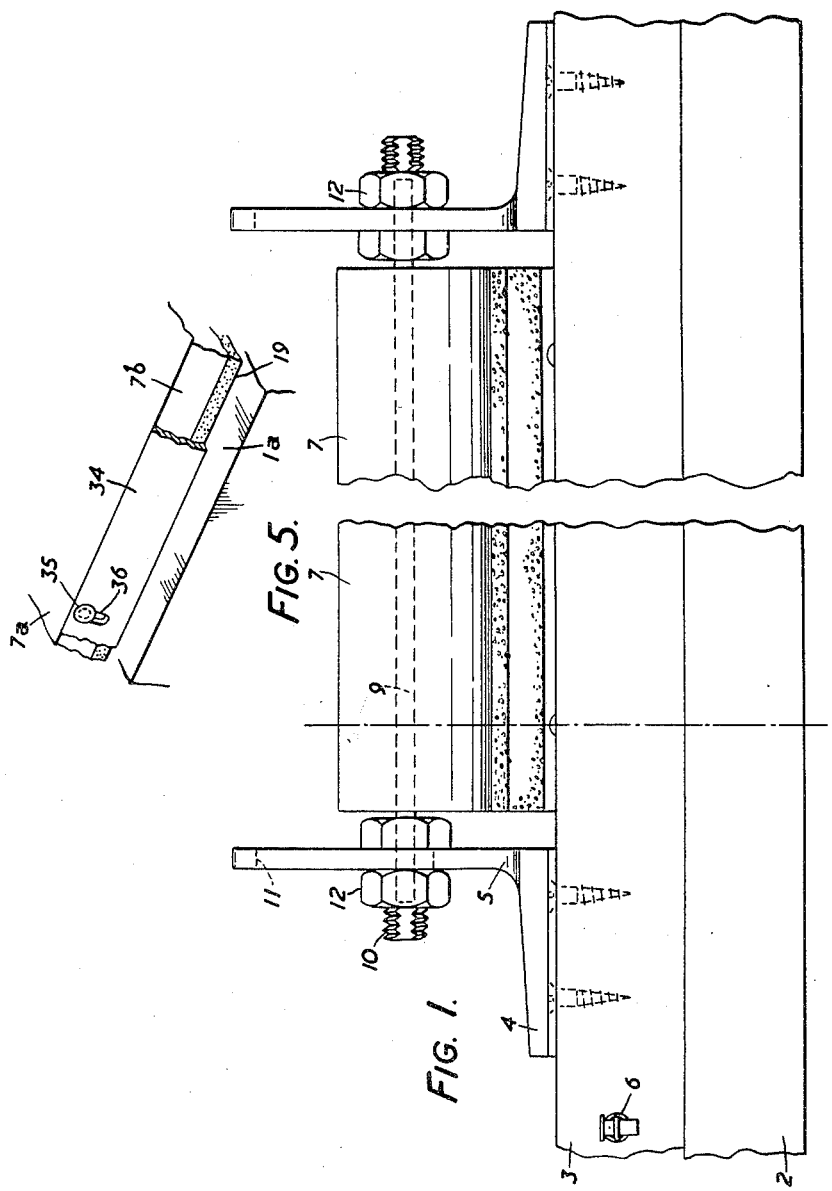

Dec. 25, 1962 L. WEBB 3,070,148
APPARATUS FOR OVEREDGE FOLDING
AND SECURING FLEXIBLE MATERIAL
Filed Feb. 1, 1960 2 Sheets-Sheet 2

INVENTOR
Leslie Webb
BY
Harold F. Avilas
ATTORNEY

United States Patent Office 3,070,148
Patented Dec. 25, 1962

3,070,148
APPARATUS FOR OVEREDGE FOLDING AND
SECURING FLEXIBLE MATERIAL
Leslie Webb, Reading, England, assignor to
Vesco Limited, Reading, England
Filed Feb. 1, 1960, Ser. No. 5,726
Claims priority, application Great Britain Apr. 3, 1959
13 Claims. (Cl. 156—492)

The present invention relates to a method of and an apparatus for adhesively securing a margin of flexible material to a face of the material e.g., manila, or to a face of a member in sheet or board form to which the flexible material is attached, e.g., a piece of relatively stiff and generally thicker board material, and it is particularly suitable in cases where it is necessary, after the flexible material has been adhesively secured to one face of such a member, to fold one or more of its margins around the edge of the member and secure it adhesively and firmly to the adjacent part of the opposite face of the member and where practicable to the edge of the member. The invention is particularly, although not exclusively, applicable where the said member is the case of a looseleaf or other binder, or a component thereof, in which case the flexible material may be any suitable covering material such as Rexine.

As far as we know, the operation is still largely done by hand, involving skilled workers and a good deal of thumb and hand rubbing which is a tiring and sticky performance which women especially dislike.

The present invention aims at a simple method and apparatus whereby the aforesaid operation can be the more conveniently performed.

The method according to the present invention of adhesively securing a margin of flexible material to a face of the said material or to a face of a member to which the flexible material is attached, comprises progressively pressing the said margin from the edge of the work to the free edge of the margin by means of opposed clamping jaws whilst these travel with the work in a direction transverse to the said margin and approach one another. Preferably the opposed clamping jaws respectively slide and turn whilst travelling with the work and pressing the said margin, the turning jaw approaching the sliding jaw during such travel.

More specifically, the method is carried out with the work comprising flexible material adhering to one face of a board or sheet member with at least one margin of such material unsecured, the work being inserted between the opposed clamping jaws provided the one by a platform and the other by a pivoted bar, up to an abutment opposing the edge of the work and thereafter the work being displaced, the platform slid and the bar turned so as to fold and progressively press the said margin from the said edge onto the opposite face of the board or sheet member of the work.

The invention also provides apparatus for carrying out the method comprising opposed clamping jaws converging from a work receiving inlet and co-operative for simultaneous movement in the direction of the convergency while approaching one another for applying a progressive pressure on the work.

Preferably one clamping jaw is slidable and the other clamping jaw is mounted for turning movement simultaneously with the sliding movement of the first jaw.

One of the clamping jaws may have an abutment which is engageable by relatively stiff work inserted between the clamping jaws so that the elements may be simultaneously displaced to perform the pressing and clamping operation by displacement of the work. Alternatively the apparatus may have means for producing the movement of the clamping jaws so that the work can be inserted between such jaws and moved thereby and therewith to perform the pressing and clamping operation.

The sliding jaw may be a platform to support the work and the turning jaw a pivoted bar, the said abutment being on the bar at the rear of the converging space formed between the opposed clamping faces.

The pressure on the folded margin is preferably made of a yielding or resilient character and this may be achieved by providing one or both of the opposed clamping faces, e.g., the underface of the bar, with a resilient pressure pad, such as a strip of foamed rubber or plastic (covered or not). The action then takes the place of that ordinarily carried out by hand, viz., folding and pressing the material by a rubbing action by means of the fleshy part of the thumb and of the hand, and by the uniform progressive action over the whole length of the relevant margin.

The clamping jaws may be returned to open position by spring, gravity or other suitable means. For example, spring means may be provided to permit the return of the platform and bar and consequent separation of the clamping faces after the folding and pressing operation has been completed and the work is being withdrawn. Alternatively the bar may be constructed and pivoted so as to be returned by gravity.

The sliding platform and the pivoted bar may be linked together in appropriate manner to permit the desired relative turning and sliding movements to result the one from the other and the abutment which is preferably a longitudinal projection of, or a bar attached to, the pivoted bar, may be arranged to bear against the back of the slidable platform. Various means are available for interconnecting the slidable platform and the pivoted bar so that they will have the desired simultaneous movement. For example, a headed pin and slot linkage may be provided between the rear of the platform and the abutment on the pivoted bar or the platform and the abutment on the bar may make such free tongue and groove connection that the turning of the bar in either direction causes simultaneous sliding of the platform, e.g., the longitudinal projection on the bar forming the abutment may engage in a suitably, e.g., dovetail, shaped longitudinal groove (which may be medially gapped) in the platform.

The pivot axis of the bar may be arranged above and rearwardly of the back edges of the clamping faces throughout the movement of the latter to the position in which the faces have closed to parallelism.

The sliding platform is preferably associated with a parallel fixed platform so as to provide additional bearing surface for the work prior to and during the operation of locating it against the abutment and displacing it and the slidable platform and the bar.

The ends of the bar may be supported by journals or trunnions fixed to the bar or forming bearings therefor, and these journals or trunnions or sliding blocks carrying them may be adjustable, e.g., in vertical guide slots, so that the apparatus may deal with members of different thickness.

In a simple form of the apparatus, the operator may merely press the work, if of sufficient stiffness, between the clamping jaws and against the abutment and displace the bar and therewith the platform for performing the folding and pressing operation, but the invention also envisages that the apparatus may have a pedal-operated or other means, such as a handle on the bar, for turning the bar and sliding the platform, especially where the work is not sufficiently stiff to enable the bar and platform to be displaced by the pressure of the work.

The aforesaid fixed platform may be replaceable by a platform of different width or one or more auxiliary platforms may be provided for use where the size of the work requires. Where the construction is appropriate, the slidable platform may have or have attachable to it or movable with it a fence member (which may form part of a feed tray) to enable the edge of the work opposite that aforesaid to which the margin in question is to be secured, to be positioned and pressure to be applied through it by way of the fence to displace the work during the folding and pressing operation. This may be particularly desirable when the work comprises a board member (case) of a sectional character, e.g., is of the type comprising five separate stiff board sections folding about flexible hinges provided by the attached flexible covering material and forming (a) the spine of the case, (b) two clamping bar mounting strips one along each side of the spine and (c) the covers proper hinged to the strips. The edges at right angles to the hinges may be readily positioned and covered with the aid of the hereindescribed apparatus and said fence.

In order that the invention may be the more readily understood, reference is hereinafter made to the apparatus, illustrated by way of example, in the accompanying drawings in which FIG. 1 is a front elevation and FIG. 2 an end sectional elevation of one form of apparatus according to the invention and FIG. 3 shows a modified pivoted arrangement for the bar. FIGS. 4 and 5 show another modified construction.

In the apparatus shown in FIGS. 1 and 2, a slidable platform 1 (of bar form) forming one clamping jaw is arranged for movement in a direction transversely of the platform and in the planes parallel to the top of a table 2. The slidable platform normally lies adjacent to and parallel with a platform 3 fixed to the said table and in effect extending the upper surface of the slidable platform. The sliding platform in this instance is constrained against other movement than transversely of itself and parallel to the table by plates 4 which are a part of or are fixed to brackets 5 projecting from the fixed platform over the slidable platform. Helical extension springs 6 are let into opposed sockets in the slidable and fixed platforms so that the slidable platform will move back up to the fixed platform when separating pressure is released.

A bar 7 forming the other clamping jaw in this case of triangular cross section, is pivotally mounted at 8, e.g., supported by a bearing rod or spindle 9 or end pins or trunnions which are fixed or rotatable in hollow screws 10 lockable in slots 11 in the brackets 5 fixed to the fixed platform on the table 2. These screws may be released by slacking nuts 12 and manually adjustable in the slots 11 and fixed in adjusted position by tightening the nuts.

Retention of the slidable platform against other than sliding movement in the desired plane may be achieved by various other ways, e.g., by tongue and groove engagement with appropriate fixed means and the brackets supporting the spindle or pins of the pivoted bar may be supported on any appropriate fixed part of the apparatus, e.g., on the table.

The pivoted bar provides a rear bottom abutment 13 for the leading edge of the work when this is inserted at the inlet end of the convergency formed between the plane clamping face 14 of the bar and the opposed clamping face 15 of the platform.

The pivoted bar is linked to the slidable platform in appropriate fashion, in the illustrated apparatus by the shanks 16 of screws or pins projecting from the back of the slidable platform engaging slots 17 in the metal angle bar 18 fixed to the under side of the pivoted bar, and heads 19a being engaged by the back of the angle bar, which provides the abutment.

A strip of foamed rubber or plastic material 19 is secured along the recess formed between the bar 7 and angle bar 18 to provide the pivoted bar with a yielding pressure face.

The pivot axis of the pivoted bar is rearwards of the vertical plane through the back top edge of the slidable platform and the front of the abutment in the clamping position. The abutment is arranged so that it will remain in close proximity to the top back edge of the slidable platform and to allow for the turning movement of the bar, the back face of the slidable platform may be raked back as shown at 20 (or alternatively the abutment appropriately raked to accommodate the turning movement thereof). The foamed rubber or plastic strip extends transversely up to the abutment face.

The front face 21 of the clamping bar slopes rearward from the bottom edge of the bar.

The spring means will normally hold the slidable platform in its forward position with the clamping face 14 of the pivoted bar making the desired angle with the clamping face 15 of the platform. The pivot axis of the pivoted bar will be adjusted according to the thickness of the work for example so that in the final clamping position of the bar the strip of foamed substance will be compressed by the work.

The back of the bar may be extended or have a fixed or other load for gravity return of the bar.

Assuming that the work is constructed with the flexible material 22 adhered to one face of the board member 23, with an adhesive margin 24 projecting to the requisite degree, the operator applies the work by one edge to the sloping front 21 of the pivoted bar, turning up the said margin in the process, and then whilst maintaining pressure of said edge against the sloping face moves the edge down the face until the edge with the folded material thereagainst can enter the inlet formed by the mouth of the V-space between the opposed clamping faces of the bar and the platform. The work is then pushed into the space, the margin being partially folded in so doing, until the margin of the flexible material engages the abutment 13 and is pressed against the edge of the board member. Further pressure on the work now displaces the slidable platform and causes the clamping bar to turn downwards. The foamed strip will now press on the margin of flexible material first from the edge of the board member and then progressively towards the now front edge of the marginal material until finally the opposed clamping faces are parallel or substantially so. The marginal flexible material will therefore be pressed continuously along the edge of the board member and from that edge to the hitherto free edge of the flexible material. This progressive action, taking place uniformly across the marginal material over its whole length is effected by the yielding action of the foamed strip material and a smooth uniform lay of the said material around the edge and over the adjacent facial area of the board is obtained.

In the alternative shown in FIG. 3, end journals or trunnions 25 of the clamping bar are mounted in bearing blocks 26 which are mounted on springs 27 and are slidable vertically in suitably shaped guides 28 in end columns or standards 29 which mount screws 30 whereby the bearing blocks may be adjusted vertically according to the thickness of the board member and the depth of grip required between the clamping faces. The nuts in which the screws work may be formed by sleeves cast with the end columns or standards.

In the construction shown in FIGS. 4 and 5, the abutment 13a on the pivoted clamping bar 7a engages with little or no lost motion the narrow top 31 of aligned dovetail-grooves at the back of the slidable platform 1a. The grooves may be formed integrally with the platform or, as shown, by attached angle members 32 co-operating with a suitably sloped back 33 of the platform. These angle members may rest on the table and by co-operation with end standards as shown in FIG. 3, supporting the trunnions of the bar, hold the platform against endwise movement. The angle members may be screwed to the platform by deeply countersunk screws to provide recess for lubricant. Or lubricating passages through the platform may be provided. The bar is constructed so that its centre of gravity lies behind the pivot axis so that normally the clamping faces will be held open in convergent relation under the influence of gravity and the position of the pivot axis above the platform plane is chosen so that it is behind the rear edges of the clamping faces until or even when these faces are in parallel clamping position.

A guide bar or strip or two or more of them may be provided to guide the work into the mouth of the convergency between the clamping faces. Such a strip, 34, is shown in FIG. 5. It may be of metal or other suitable material retained against the front face 7b of the pivoted bar 7a by headed pins 35 which are screwed or otherwise secured to the pivoted bar and engage slots 36 in the strip. The strip depends a little below the lower edge of the foamed pad 19 when the clamping faces are fully apart. The strip rises freely when the clamping faces are being brought together and does not interfere with the clamping action.

The apparatus may be covered by a removable hood, or a fixed hood may be provided which covers all save the inlet to the convergency formed by the clamping faces although the front of the pivoted bar may also be left exposed when desirable.

The sliding platform may have a foot or spaced feet extending rearwardly to lessen the risk of the platform tending to turn about its rear edge if it is not positively held down by suitable guiding means. The angle members 32 shown in FIG. 4, also serve this purpose.

A buffer means may be interposed between the fixed and sliding platforms, e.g., by way of a rubber pad or pads, and/or between the sliding platform and the abutment to promote quiet operation especially if the said parts are of metal.

The springs may be mounted in end grooves or channels in the sliding and fixed platforms and the fixed platform may be detachably fixed, e.g., screwed, to the table, to promoted disassembly for inspection or repair.

The table may be provided with a downwardly extending projection or projections so that the apparatus can be supported on a bench or other firm support with the projection or projections co-operating with the front edge of the said support in which case the apparatus may be effectively located for use without necessitating fixing it to the support.

What I claim is:

1. Apparatus for adhesively securing a margin of a flexible member to an adjacent face of the same or another member constituting the work, comprising cooperating clamping jaws providing opposed clamping faces converging to form a work receiving inlet, means for guiding one of said jaws in sliding movement and means pivotally supporting the other of said jaws and means inter-connecting the said jaws for simultaneous movement in the direction of the convergency while the jaws are closing.

2. Apparatus according to claim 1, in which the said slidable jaw is a platform to support the work and the said pivotally mounted jaw is a pivoted bar, said bar having an abutment which is engageable by the leading edge of the work and the platform having means co-operating with said abutment to enable the displacement of the work to produce the simultaneous sliding and turning movement of the jaws.

3. Apparatus according to claim 1, in which at least one of said jaws is loaded to return both jaws respectively by reverse sliding and pivoting to inoperative position in which the jaws are convergently open, all by gravity action.

4. Apparatus according to claim 1, in which said pivotally supported jaw is loaded so as to return both jaws respectively by reverse sliding and pivoting by gravity to the inoperative position in which the jaws are convergently open, said interconnecting means serving to cause the slidable jaw simultaneously to be returned by the gravity action of the first jaw.

5. Apparatus according to claim 1, said pivotally mounted jaw having an abutment which is engageable by the leading end of stiff work inserted into the convergency provided by said converging faces; and said interconnecting means comprising a headed pin and slot connection between the slidable jaw and the abutment on the bar so that the slidable jaw slides and the bar turns when the abutment is displaced.

6. Apparatus according to claim 1, said pivotally mounted jaw having an abutment which is engageable by the leading end of stiff work inserted into the convergency provided by the opposed clamping jaws; and said interconnecting means comprising a tongue and groove engagement between the abutment and the sliding jaw so that turning of the pivotally mounted element in either direction causes simultaneous sliding of the slidable jaw.

7. Apparatus according to claim 1, in which the turning axis of the said pivotally mounted clamping jaw is above and rearwardly of the back edges of the clamping faces throughout the movement of the jaws to the position in which the clamping faces have closed to parallelism.

8. Apparatus according to claim 1, in which the said slidable jaw is a platform to support the work and the turning jaw is a pivoted bar, said bar having an abutment which is engageable by the leading edge of the work to enable the displacement of the work to produce the simultaneous sliding and turning movement of the platform and bar, and a fixed platform associated with the slidable platform so as to provide additional bearing surface for the work prior to and during the operation of pressing it against the abutment and displacing the platform and bar.

9. Apparatus according to claim 1, in which the said slidable jaw is a platform to support the work and the turning jaw is a pivoted bar the clamping face of which is provided by a resilient pad.

10. Apparatus according to claim 1, having adjustment means for varying the position of the pivotal axis of the one jaw and thus separation between the clamping faces of the opposed jaws when in parallelism.

11. Apparatus according to claim 1, in which the said slidable jaw is a platform to support the work and the turning jaw is a pivoted bar the clamping face of which is provided by a resilient pad, and a slidable member carried by the said bar which covers the front edge of the said pad and means whereby said slidable member rises when the jaws are being brought to final clamping position.

12. Apparatus for adhesively securing a margin of a flexible member to an adjacent face of the same or another member constituting the work, comprising co-operating clamping jaws providing opposed clamping faces converging from a work receiving inlet, said jaws being co-operative for simultaneous movement in the direction of the convergency while approaching one another for applying a progressive pressure on the work, one of said clamping jaws having an abutment which is engageable by relatively stiff work inserted between the clamping jaws so that the closing and simultaneous displacement of the said jaws can be performed by the displacement and pressure of the work.

13. Apparatus for adhesively securing a margin of a flexible member to an adjacent face of the same or another member constituting the work, comprising co-operating clamping jaws providing opposed clamping faces converging from a work receiving inlet, said jaws being co-operative for simultaneous movement in the direction of the convergency while approaching one another for applying a progressive pressure on the work, and comprising means for producing the movement of the clamping jaws so that the work can be inserted between such jaws and moved thereby and therewith in the direction of the convergency to perform the pressing and clamping operation.

References Cited in the file of this patent

UNITED STATES PATENTS

| | | |
|---|---|---|
| 10,961 | Danforth | May 23, 1854 |
| 331,812 | Norris | Dec. 8, 1883 |
| 793,108 | Taylor | June 27, 1905 |
| 945,012 | Bernard | Jan. 4, 1910 |
| 1,037,097 | Woodhull | Aug. 27, 1912 |
| 1,131,877 | Trumper | Mar. 16, 1915 |
| 1,640,515 | Ohlsson | Aug. 30, 1927 |
| 1,681,984 | Lessman | Aug. 28, 1928 |
| 2,046,047 | Watkins | June 30, 1936 |
| 2,407,436 | Miller | Sept. 10, 1946 |
| 2,621,142 | Wetherell | Dec. 9, 1950 |
| 2,808,099 | Silverman | Oct. 1, 1957 |

FOREIGN PATENTS

| | | |
|---|---|---|
| 779,166 | Great Britain | July 17, 1957 |